US009334998B2

(12) United States Patent
Duttenhoefer

(10) Patent No.: US 9,334,998 B2
(45) Date of Patent: May 10, 2016

(54) TUBULAR LINER FOR REHABILITATING DEFECTIVE SEWERS

(71) Applicant: BRANDENBURGER PATENENTVERWERTUNG GBR, Landau (DE)

(72) Inventor: Peter Duttenhoefer, Ilbesheim (DE)

(73) Assignee: Brandenburger Patentverwertung GbR, Landau (DE)

( * ) Notice: Subject to any disclaimer, the term of this patent is extended or adjusted under 35 U.S.C. 154(b) by 250 days.

(21) Appl. No.: 14/088,627

(22) Filed: Nov. 25, 2013

(65) Prior Publication Data

US 2014/0076448 A1 Mar. 20, 2014

Related U.S. Application Data

(63) Continuation of application No. PCT/EP2012/001843, filed on Apr. 28, 2012.

(30) Foreign Application Priority Data

May 24, 2011 (DE) .......................... 10 2011 103 001

(51) Int. Cl.
*F16L 55/16* (2006.01)
*F16L 55/165* (2006.01)
(Continued)

(52) U.S. Cl.
CPC ............. *F16L 55/165* (2013.01); *F16L 11/042* (2013.01); *F16L 55/1654* (2013.01); *F16L 55/1656* (2013.01); *E03F 2003/065* (2013.01)

(58) Field of Classification Search
CPC ........................... F16L 55/165; F16L 55/1654
USPC ............. 138/98, 97; 405/150.1, 184.1, 184.2; 264/267, 516, 269; 156/294, 287
See application file for complete search history.

(56) References Cited

U.S. PATENT DOCUMENTS 5,186,987 A * 2/1993 Imoto ....................... B32B 5/26
138/128
5,334,429 A * 8/1994 Imoto ..................... B29C 63/34
138/128

(Continued)

FOREIGN PATENT DOCUMENTS

DE 212004000053 U1 7/2006
EP 0454309 A2 10/1991

(Continued)

OTHER PUBLICATIONS

German Patent and Trademark Office Search Report, Dated February 28, 2012.

(Continued)

*Primary Examiner* — Patrick F Brinson
(74) *Attorney, Agent, or Firm* — Laurence A. Greenberg; Werner H. Stemer; Ralph E. Locher

(57) ABSTRACT

A tubular liner for rehabilitating sewers includes a circumferentially expandable reinforcing layer impregnated with a light-curable reactive resin, and an outer tubular film surrounding the reinforcing layer and formed of a radially expandable material impermeable to UV light, in particular a liquid-tight and gas-tight plastic film. The tubular liner can be pulled into a sewer to be rehabilitated and can be expanded, in particular by using compressed air, so that the reinforcing layer and the outer tubular film contact the inner wall of the sewer before the reactive resin is cured. A protective tube made of a tear-resistant material is disposed around the outer tubular film and has a connecting portion extending in the longitudinal direction of the outer tubular film and being expandable in the circumferential direction by introducing compressed air into the tubular liner.

21 Claims, 5 Drawing Sheets

(51) Int. Cl.
*F16L 11/04* (2006.01)
*E03F 3/06* (2006.01)

(56) References Cited

U.S. PATENT DOCUMENTS

| | | | | |
|---|---|---|---|---|
| 5,503,695 | A * | 4/1996 | Imoto | B29C 63/34 156/287 |
| 5,698,056 | A * | 12/1997 | Kamiyama | B29C 66/1142 138/98 |
| 5,798,013 | A | 8/1998 | Brandenburger | |
| 6,296,729 | B1 * | 10/2001 | Kamiyama | B29C 65/505 138/98 |
| 6,612,340 | B1 * | 9/2003 | Lause | F16L 55/1651 138/97 |
| 6,679,966 | B1 | 1/2004 | Brandenburger | |
| 6,708,729 | B1 * | 3/2004 | Smith | F16L 55/1656 138/124 |
| 7,857,932 | B1 | 12/2010 | Driver et al. | |
| 2009/0283212 | A1 | 11/2009 | Kubel | |
| 2010/0012214 | A1 * | 1/2010 | Kamiyama | F16L 55/1656 138/98 |

FOREIGN PATENT DOCUMENTS

| | | |
|---|---|---|
| EP | 0712352 B1 | 10/1997 |
| EP | 0863359 A1 | 9/1998 |
| WO | 0073692 A1 | 12/2000 |
| WO | 2007073692 A1 | 7/2007 |
| WO | 2009021479 A1 | 2/2009 |

OTHER PUBLICATIONS

International Search Report of PCT/EP2012/001843, Dated July 10, 2012.

* cited by examiner

TUBULAR LINER FOR REHABILITATING DEFECTIVE SEWERS

CROSS-REFERENCE TO RELATED APPLICATION

This is a continuation, under 35 U.S.C. §120, of copending International Application No. PCT/EP2012/001843, filed Apr. 28, 2012, which designated the United States; this application also claims the priority, under 35 U.S.C. §119, of German Patent Application DE 10 2011 103 001.1, filed May 24, 2011; the prior applications are herewith incorporated by reference in their entirety.

BACKGROUND OF THE INVENTION

Field of the Invention

The invention relates to a tubular liner for rehabilitating defective sewers, including a circumferentially expandable reinforcing layer impregnated with a light-curable reactive resin, and an outer tubular film surrounding the reinforcing layer and formed of a radially expandable material impermeable to UV light, preferably a liquid-tight and gas-tight plastic film. The tubular liner may be introduced into a sewer to be rehabilitated and expanded, in particular with the aid of compressed air, so that the reinforcing layer and the outer tubular film come to lie against an inner wall of the sewer before the curing of the reactive resin.

In the field of trenchless rehabilitation of defective sewers, tubular liners, which are referred to as "inliners," are increasingly being used. The tubular liners are formed of a fiber material, in particular of glass fiber fabric, which is impregnated with a liquid reactive resin that is cured by using light from a radiation source after the tubular liner has been pulled into the pipeline and expanded with the aid of compressed air. Such a tubular liner and a method for producing such a liner are known, for example, from International Publication No. WO 00/73692, corresponding to U.S. Pat. No. 6,679,966. The tubular liner described therein has an inner tubular film with a laminated nonwoven layer onto which resin-impregnated fiber rovings are wound in an overlapping manner on a winding mandrel. In order to protect the circumferentially expandable fiber tube produced in that manner from being cured by the UV light contained in sunlight, prior to being transported to a construction site, the fiber tube is enclosed by a lightproof outer tubular film which is continuously applied after the winding operation in the form of two longitudinal sheets that are heat-fused to one another at side edges. The outer tubular film is usually formed of a highly expandable light-impermeable film, for example a polyester film, which expands to the same extent as the fiber material when the fiber tube is expanded by using compressed air inside the sewer that is being rehabilitated. As a result of the expansion, the circumference of the fiber tube sometimes increases by up to 10% of the original value, thus ensuring that the fiber tube can adapt within certain limits to varying sewer diameters.

In order to pull the tubular liner, which often has a length of up to 200 m or more and can weigh several tons, into a sewer to be rehabilitated without the outer tubular film being damaged, it is known to pull a protective tube of a highly tear-resistant material into the sewer in advance, so as to cover protruding projections and edges in the sewer wall and to allow the liner to slide along on the protective tube while pulling in. It is also known to pull in a nonslip film, solely in the region of the sewer. In that case it is a problem that the protective tube, which is also referred to as a preliner, or the nonslip film, cannot be pulled into the sewer at the same time as the tubular liner, since in that case the tubular liner is not tensioned and successive folds form in it, greatly weakening the tubular liner after the curing. Due to the reduced expandability, it is also not unusual to fabricate the preliner around the tubular liner during the production of the latter. The additional working step which that involves and is required for pulling in the preliner, considerably increases the costs for sewers to be rehabilitated.

SUMMARY OF THE INVENTION

It is accordingly an object of the invention to provide a tubular liner for defective sewer rehabilitation, which overcomes the hereinafore-mentioned disadvantages of the heretofore-known liners of this general type and which can be pulled into a sewer to be rehabilitated substantially without any folds in one operation together with a protective tube of a tear-resistant material surrounding it.

With the foregoing and other objects in view there is provided, in accordance with the invention, a tubular liner for rehabilitating sewers, including a reinforcing layer which can be made to expand in the circumferential direction and is produced, in particular, by helically winding a fiber roving that is impregnated with a light-curable reactive resin, on a winding mandrel. The winding mandrel is preferably covered in this case in a known way by an inner tubular film, in order to ensure that the reinforcing layer together with the inner tubular film can be continuously removed from the winding mandrel. An outer side of the reinforcing layer is surrounded by an outer tubular film, which is formed of a material that is impermeable to UV light, in particular a heat-fusible, liquid-tight and gas-tight plastic film. The reinforcing layer of fiber material which may, for example, include a glass fiber scrim or a combination of a glass fiber scrim and a random fiber layer, for example a nonwoven layer, is radially expandable in the same way as the outer tubular film in the circumferential direction, for example by up to 10% beyond the original diameter, when the tubular liner is subjected in a known way to a pressurized fluid, preferably to compressed air, after being pulled into a sewer to be rehabilitated. The circumferential expansion of the tubular liner ensures in this case that, even in the case of a varying sewer diameter, it comes to lie against the inner wall of the sewer to be rehabilitated, and accordingly the available cross section of the sewer is retained as far as possible even after the curing of the tube. Once the tubular liner has been pulled into the sewer and made to expand, the reactive resin is cured, which is preferably performed by a UV light source that emits a range of wavelengths made to match the UV initiators contained in the reactive resin being pulled through the space inside the tubular liner.

The tubular liner according to the invention is distinguished by the fact that a protective tube of a tear-resistant, non-expandable liquid-tight material, which preferably is formed of the same coated textile material from which the tarpaulins of heavy trucks are produced, is disposed around the outer tubular film. Wherever reference is made below to a tear-resistant material, this means in particular that the material does not tear when it is exposed to the tensile forces acting during the pulling in of the tubular liner when the protective tube catches on a projection or corner within the sewer to be rehabilitated.

According to the invention, the protective tube has a connecting portion, which extends in the longitudinal direction of the tubular liner, i.e. substantially parallel to the longitudinal axis of the tubular liner, and is expandable according to the invention in the circumferential direction when the tubular liner is made to expand with the aid of compressed air. To put it another way, the protective tube is formed of a tear-resistant material which protects the inner-lying sensitive outer tubular film from damage when it is being pulled into the sewer to be rehabilitated, and which accordingly has a considerably higher modulus of elasticity than the outer tubular film and the reinforcing layer, which would lead to a circumferential expansion of preferably less than 1% of the diameter under the applied pressures during the expansion of the tubular liner. Accordingly, the outer tubular film and the reinforcing layer have a considerably lower modulus of elasticity, which may preferably be more than ten times the coefficient of expansion of the protective tube.

The invention provides the advantage that the tubular liner, protected by the protective tube, can be pulled into the sewer to be rehabilitated substantially without any folds in one operation, without there being the risk that, after the pulling-in operation, the tubular liner can no longer expand in the circumferential direction in order to come to lie against the inner wall of the sewer.

In the case of the preferred embodiment of the invention, the protective tube is fixed to the outer side of the outer tubular film along a contact portion extending at least some of the way in the longitudinal direction of the tubular liner, which is preferably performed with the aid of double-sided adhesive tape which, after the application of the outer tubular film to the reinforcing layer in the winding machine that is used, is rolled synchronously with the drawing-off rate of the outer tubular film in particular on the underside thereof. It is similarly conceivable, however, that, instead of a double-sided adhesive tape, an adhesive seam, for example hotmelt adhesive, and/or a heat-fused seam is produced between the outer tubular film and the protective tube, located—with respect to the tubular liner used in a sewer—on the underside thereof. This provides the advantage that the forces that are preferably introduced into the protective tube for pulling in the tubular liner, for example by way of a correspondingly dimensioned pulling cable, are introduced primarily into the bottom region of the tubular liner, which almost completely prevents the formation of folds. It goes without saying that further contact portions may similarly be provided in the lateral regions, for example in the region of 3 o'clock and 9 o'clock, in order to further reduce the formation of folds particularly in the case of tubular liners with very large diameters, if appropriate. As an alternative to the pulling of the tubular liner into the sewer to be rehabilitated by using a pulling cable, it is also possible in the case of all of the embodiments for it to be everted into the sewer from the inside out, similar to a sock, in a known way with the aid of compressed air, water or some other fluid.

The adhesive used is preferably a permanently elastic and permanently tacky adhesive, such as that which is also used in the case of adhesive tapes, and which allows a circumferential displacement of the outer tubular film with respect to the inner side of the protective tube under the effect of shearing forces. This can be further promoted by incorporating an additional sliding substance, for example Teflon, or lubricating soap or by a friction-reducing material combination between the outer side of the outer tubular film and the inner side of the protective tube.

In the case of the preferred embodiment of the invention, the protective tube is formed of one or more circumferential partial sheets of the tear-resistant material, the two mutually adjacent longitudinal portions of the one or more partial sheets of the material being made to pass one over the other in an overlapping region and the expandable connecting portion having a predetermined tearing location extending in the longitudinal direction of the tubular liner, along which the longitudinal portions of the protective tube are connected to one another in a substantially liquid-tight manner.

This provides the advantage that the protective tube can be produced from a single non-expandable and in particular tear-resistant material, preferably from the material of a heavy truck tarpaulin. The non-expandable material of the protective tube is advantageously prefabricated as roll stock and, during the continuous production of the tubular liner, directly after the application of the outer tubular film is continuously disposed around the latter, for example by way of a known forming shoulder. Directly after that, the protective tube is closed in a liquid-tight and gas-tight manner along the predetermined tearing location. Two partial sheets of the non-expandable material are preferably used in this case, in order to facilitate the handling of the roll stock even in the case of large diameters of the tubular liner.

The closing of the mutually overlapping longitudinal portions of the non-expandable, tear-resistant material is preferably performed in this case with the aid of adhesive tape or double-sided adhesive tape, which is disposed along the predetermined tearing location in the overlapping region on or between the mutually adjacent portions of the tear-resistant material. In a way similar to the way described above, in this case the adhesive tape may be continuously rolled onto the overlapping region or onto the protective tube during the production process, before the inner side of the outer-lying portion of the longitudinal edge is made to pass over the region of the inner-lying longitudinal edge. This provides the advantage that the composite including the tubular liner and the protective tube can be produced at very low cost in one method step, which reduces the production costs. It goes without saying that the single-sided adhesive tape or double-sided adhesive tape is coated with a permanently elastic and permanently tacky adhesive, the force effect of which is sufficient to fix the longitudinal portions adhesively bonded to one another of the tear-resistant material to one another, but comes apart under the shearing forces acting in the circumferential direction and allows a circumferential displacement of the portions. In order to be able to adapt the adhesive properties of the adhesive in this case to the respective materials of the protective tube and also the sewer diameters and circumferential tensile forces, the width of the double-sided adhesive tape and/or the number of adhesive tape strips lying next to one another is preferably changed and made to match the respective conditions.

Alternatively or at the same time, there is likewise the possibility of varying the maximum shearing forces under which the predetermined tearing location tears open during the expansion of the tubular liner, by changing the backing layer of the adhesive tape in its thickness and/or in its material properties. In this case it is possible by increasing the thickness of the backing layer, for example from 1 mm to 3 mm or more, to specifically reduce the maximum shearing load-bearing capacity.

According to a further concept on which the invention is based, the predetermined tearing location includes a bead of adhesive, which connects the mutually adjacent portions of the overlapping regions to one another in a liquid-tight manner. The bead of adhesive may, for example, be formed of hotmelt adhesive, which is sprayed by way of a nozzle onto the mutually overlapping longitudinal portions of the tear-resistant material, preferably in sheet form, during the production of the tubular liner.

There is similarly the possibility of coating the tear-resistant material with a heat-fusible material, or of using a tear-resistant, non-expandable material, including a heat-fusible material, which is heated by a known heat-fusing device, for example a hot-air blower, in the overlapping region before the mutually adjacent longitudinal portions are pressed against one another, for example by a pressing roller.

In the case of a further embodiment of the invention, the applied bead of adhesive, or the heat-fused seam produced, may follow a path within the overlapping region in the form of a wavy line or in the form of a zigzag, on one hand in order to promote a coming apart of the predetermined tearing location during the expansion of the tubular liner and on the other hand to ensure that the tensile forces acting along the predetermined tearing location during the pulling in of the protective tube do not have the effect that the preferably liquid-tight connection already comes apart in the longitudinal direction before the expansion of the tubular liner.

According to a development of the concept according to the invention, the adhesive of the bead of adhesive is a meltable adhesive, which can be liquefied under the effect of heat. The adhesive may, for example, be a hotmelt adhesive, as is known to be used in hot glue guns. In the case of this embodiment, the bead of adhesive includes at least one heating wire, which can be heated by applying an electric voltage, in order to liquefy the adhesive and thereby open the predetermined tearing location for a circumferential expansion of the protective tube during the expansion of the tubular liner.

In the case of a further embodiment of the invention, the predetermined tearing location has a longitudinal perforation, which has been introduced into the protective tube and is preferably introduced into the non-expandable material only from one side, in order to preventingress of moisture into the tubular liner, in particular into the reinforcing layer, when the tubular liner is pulled into a sewer in which there are still remains of sewage. Alternatively, there is the possibility of perforating the non-expandable, tear-resistant material over its entire thickness with holes or slits and subsequently covering them by an elastic sealing compound, for example a strip of adhesive tape which can be detached even by low shearing forces. A variation of the spacing and/or depth and/or length of the perforation openings introduced makes it possible in this case to change the maximum retaining force under which the predetermined tearing location tears open during the expansion of the tubular liner. The embodiment of the invention described above has the advantage that the longitudinal perforation can already be introduced in a well-defined way during the prefabrication of the sheet material from which the protective tube is produced, for example with the aid of a laser or a punching tool, whereby the range of tolerance for the desired maximum retaining forces can be kept low.

According to a further concept on which the invention is based, a bead of adhesive extending in the longitudinal direction of the tubular liner and being formed of a permanently tacky adhesive is disposed in the expandable connecting portion of the protective tube, preferably has a cross-sectionally circular or oval form and during the expansion of the tubular liner rolls in the circumferential direction between the mutually adjacent portions of the overlapping region. The bead of adhesive may be constructed in this case in a way similar to a sealing cord, and for example have a core which is formed of an elastic and deformable material that is coated with a permanently tacky adhesive, similar to that used in the case of double-sided adhesive tapes. This embodiment of the invention has the advantage that the overlapping portions of the one or more sheets of the protective tube can be displaced in relation to one another in the circumferential direction during the expansion of the tubular liner, without the sealing effect of the bead of adhesive being neutralized and liquid being able to pass through the protective tube into the reinforcing layer and lead there to a saponification of the reactive resin. Similarly, toxic substances from the reactive resin cannot penetrate into the ground through possible tears in the outer tubular film and through the protective tube if the outer tubular film should happen to be damaged during the pulling in of the liner.

In the case of a further embodiment of the invention, the tear-resistant, non-expandable material of the protective tube, which is preferably in the form of a partial sheet, only extends around the first circumferential partial portion of the outer tubular film, and the expandable connecting portion includes a second circumferential partial portion of a material that is expandable in comparison with the first partial portion, i.e. of a material that has a considerably lower modulus of elasticity, or a considerably greater expandability, for example greater by a factor of 5 to 10 or more, than the first partial portion. The first and second partial portions, preferably in the form of material in sheet form, are adhesively bonded to one another in this case in a liquid-tight manner along both their longitudinal edges or connected to one another by way of a heat-fused connection or the like, so that substantially only the second partial portion is expanded in the circumferential direction during the expansion of the tubular liner. The second partial portion is formed for example of a plastic film, for example of a PVC or polyethylene film, which preferably also is formed of the same material as the outer tubular film. It goes without saying, however, that the second partial sheet, which for example takes up only 10% to 30% of the circumference of the protective tube and preferably runs in the region of the upper side of the tubular liner, may similarly be formed of a different plastic material or of a rubber-elastic material. The last-described embodiment of the invention has the advantage that a material that is considerably less costly than the non-tearable material of the first partial portion can be used, with this material only being subjected to comparatively little loading during the pulling in of the tubular liner into the sewer to be rehabilitated, in particular whenever it is disposed on the upper side of the tubular liner already laid in the sewer, since the frictional forces for the pulling in of the tubular liner are introduced primarily by way of the tear-resistant first partial portion, on which the entire weight of the tubular liner lies in this case.

In the case of this embodiment of the invention there is also the possibility of producing the second partial portion from a heat-fusible plastic material, which is connected in the region of the longitudinal edges to the likewise heat-fusible coating of the tear-resistant material in this case. Disposed in the overlapping region, or directly on the first partial portion, is a heating wire, which is connected to a power source during the expansion of the tubular liner in order to melt and in this way sever the plastic material of the second partial portion. This provides the advantage that the point in time at which the second partial portion can be opened, and the protective tube thereby widened in the circumferential direction, is freely selectable, without this requiring any particular matching of the predetermined tearing locations and adhesive connection to the respective sewer diameters and sewer cross-sectional forms.

According to a further concept on which the invention is based, a sliding device, for example lubricating soap or Teflon or the like, may be incorporated between the outer tubular film and the inner side of the protective tube, thereby providing the advantage that the outer tubular film can be easily displaced in relation to the initially non-expandable protective tube when the compressed air is introduced into the tubular liner. This brings about the effect that the protective tube, in particular whenever it is provided with an additional outer sliding coating, and also the outer tubular film and the reinforcing layer can adapt considerably better to a given sewer cross-sectional form, and thereby fill it substantially completely. Disadvantageous unfilled voids can be avoided in this way. In particular in the case of sewers with oval cross-sectional forms, this leads to considerably improved utilization of the flow cross sections given by the sewer to be rehabilitated.

Other features which are considered as characteristic for the invention are set forth in the appended claims.

Although the invention is illustrated and described herein as embodied in an tubular liner for rehabilitating defective sewers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
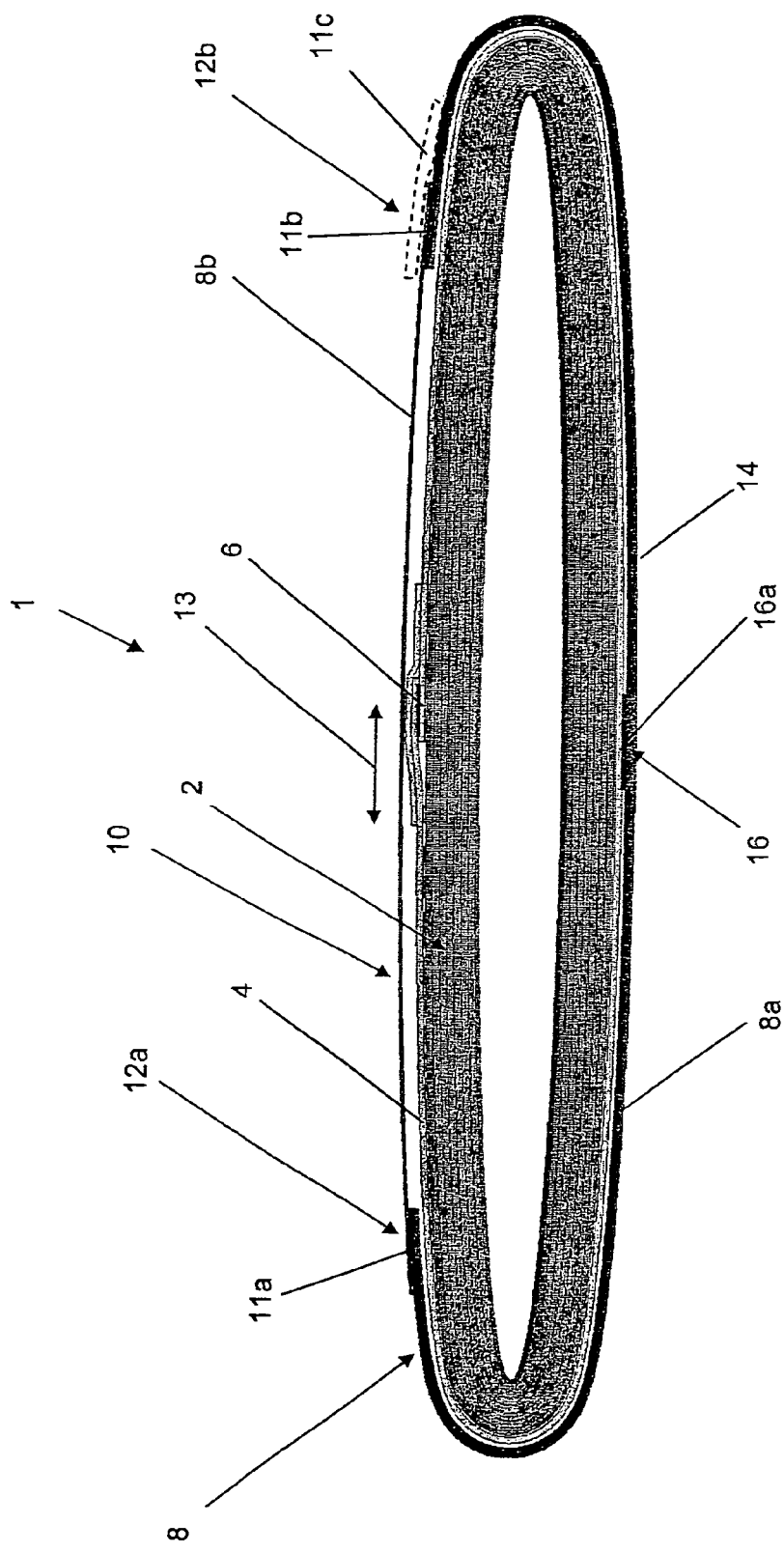
FIG. 1 is a diagrammatic, cross-sectional view of a first embodiment of a tubular liner according to the invention, in which a protective tube includes a first partial portion, of a tear-resistant material that can only expand with difficulty in the circumferential direction, as well as a second partial portion, of a second material that can expand well in the circumferential direction.
Figure 2:
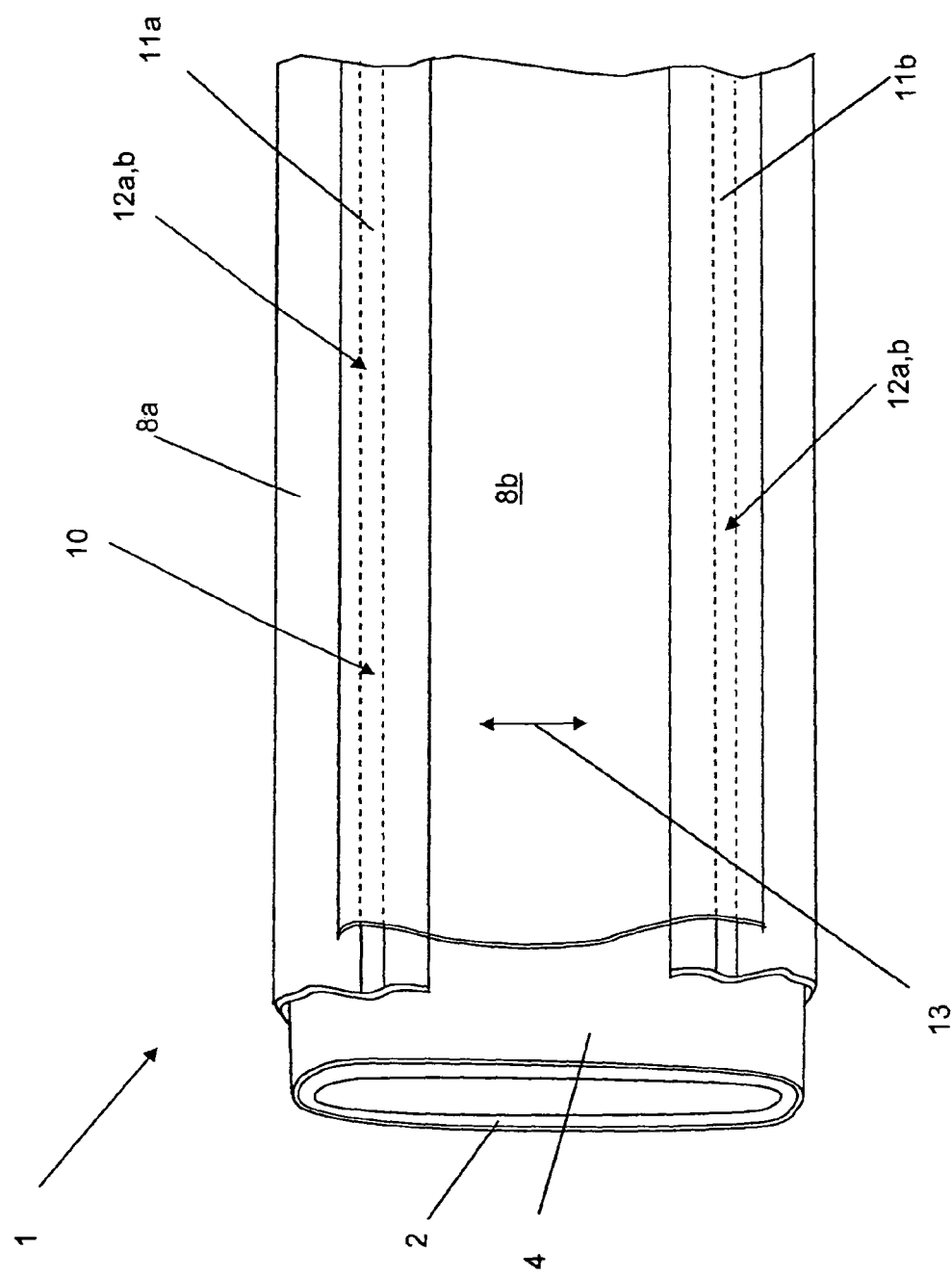
FIG. 2 is a fragmentary, perspective view of the tubular liner of FIG. 1 illustrating longitudinal portions in which the first partial portion and the second partial portion are connected to one another.

Referring now to the figures of the drawings in detail and first, particularly, to FIG. 1 thereof, there is seen a tubular liner 1 for rehabilitating sewers and wastewater drains, which are not specifically shown. The tubular liner 1 includes a preferably multilayered reinforcing layer 2 of a glass fiber fabric impregnated with a liquid reactive resin which is produced from an outer tubular film 4 of a material that is impermeable to UV light, is liquid-tight and allows an expansion of 10% or more of the original diameter in the circumferential direction when the tubular liner 1 is made to expand by compressed air after being introduced into a sewer to be rehabilitated. The outer tubular film 4 preferably is formed of a heat-fusible plastic film sheet, which is connected in the region of a longitudinal seam 6 at its longitudinal edges in a liquid-tight manner to form a tube. Disposed around the outer tubular film 4 is a liquid-tight protective tube 8, which lies closely against the outer tubular film and has a first partial portion 8a of a material that can expand with difficulty and is referred to hereinafter as non-expandable material, and a second partial portion 8b of a material that can expand well and is referred to hereinafter as expandable material. The non-expandable material 8a in this case is preferably a coated and highly tear-resistant textile fabric, as is used in the case of heavy truck tarpaulins, and the expandable material 8b is preferably formed of a plastic film. As can also be seen from the representation of FIG. 1 and also FIG. 2, the first circumferential partial portion 8a extends on the underside of the tubular liner 1 over more than half the circumference of the tubular liner and, with the tubular liner lying flat, is connected on the upper side thereof to the second expandable partial portion 8b along two mutually overlapping longitudinal portions or edges 12a, 12b by a heat-fused connection or an adhesive connection, for example a double-sided adhesive tape 11a and 11b, or an adhesive tape 11c which is coated with adhesive on one side and is adhesively attached from above and in FIG. 1 is indicated by dashed lines as an alternative. The second expandable partial portion 8b in this case represents a connecting portion 10 that is highly expandable in the circumferential direction, which is indicated in FIGS. 1 and 2 by a double-headed arrow 13. In the region of its underside 14, the first partial portion 8a of the protective tube 8 is connected by way of a contact location or portion 16 to the outer side of the outer tubular film 4, which preferably has a double-sided adhesive tape 16a. A sliding material, which is not represented specifically, for example Teflon or lubricating soap or the like, may be incorporated between the inner side of the protective tube 8 and the outer side of the outer tubular film 4, in order to allow a relative movement between the outer tubular film 4 and the protective tube 8 outside the contact region 16 during the expansion of the tubular liner 1.

Figure 3:
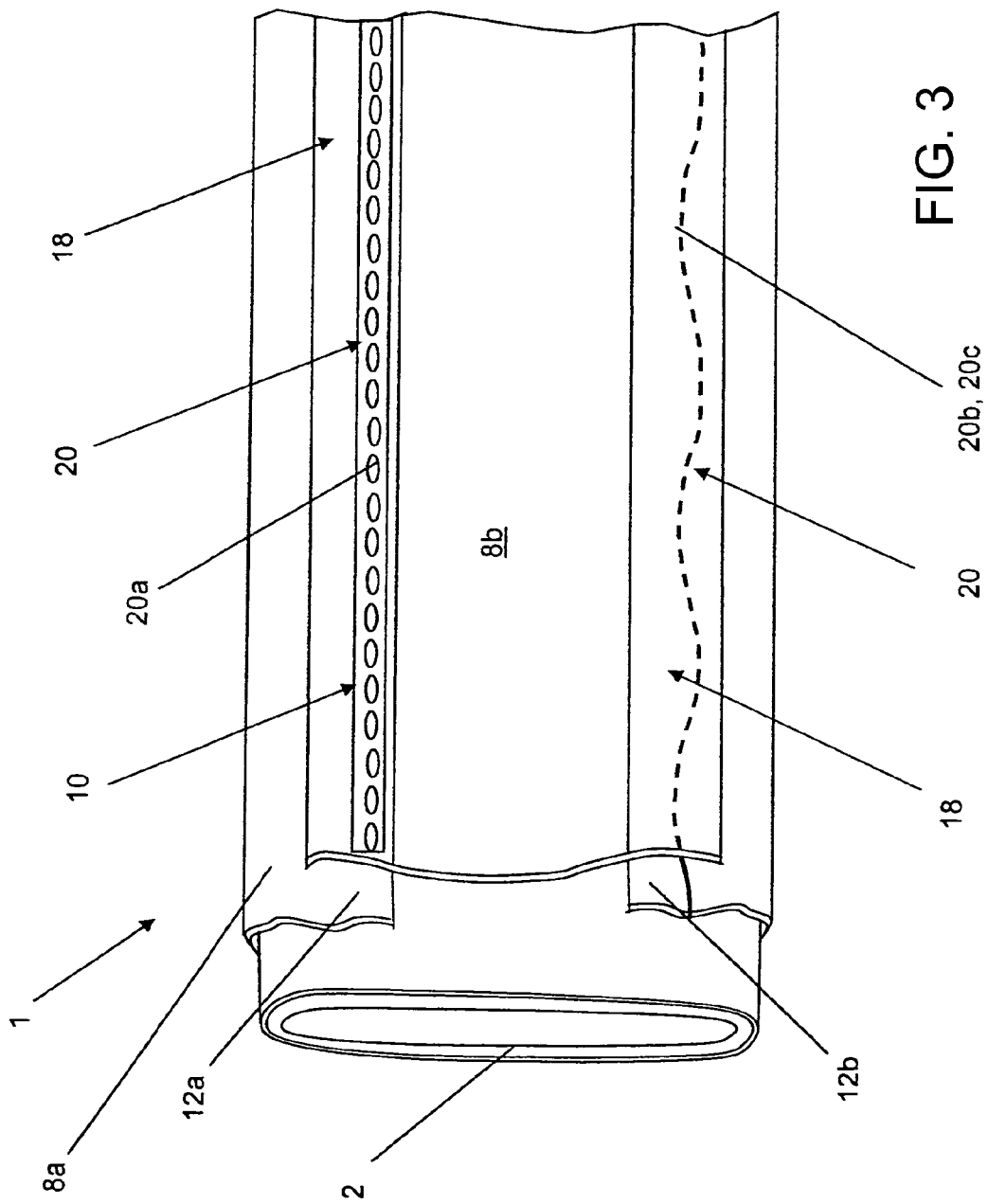
FIG. 3 is a fragmentary, perspective view of a further embodiment of a tubular liner according to the invention, in which the protective tube includes a first partial sheet, of non-expandable material, and a second partial sheet, of likewise non-expandable material, connected to the first partial sheet by way of two overlapping connecting portions, the two partial sheets being connected to one another by way of a predetermined breaking location in the form of a wavy line or a straight line.

In the case of the embodiment of the invention that is shown in FIG. 3, the second circumferential partial portion 8b also is formed of a non-expandable material, preferably of the same material as the first circumferential partial portion 8a of the protective tube 8. In the region of its longitudinal portions 12a, 12b, the tear-resistant material of the two circumferential partial portions 8a, 8b of the non-expandable material in sheet form is made to pass over itself in an overlapping region 18, and the expandable connecting portion 10 in this case includes a predetermined tearing location 20 extending in the longitudinal direction of the tubular liner 1, along which location the respective longitudinal portions 12a, 12b of the protective tube 8 are connected to one another in a liquid-tight manner before the expansion of the tubular liner 1. As is diagrammatically indicated in this case in FIG. 3, the predetermined tearing location 20 may include a longitudinal perforation 20a, or a bead of adhesive 20b or a heat-fused seam 20c, which may run both in a straight line and in the form of a wavy line. The predetermined tearing locations 20a, 20b and 20c are constructed in such a way that they tear open in the longitudinal direction of the tubular liner 1 and allow a circumferential expansion of the intrinsically non-expandable protective tube 8 when the tubular liner 1 is made to expand by introducing compressed air into the region within the reinforcing layer 2, which is preferably still covered toward the center of the tubular liner by a likewise expandable inner tubular film that is not specifically shown.

Figure 4:
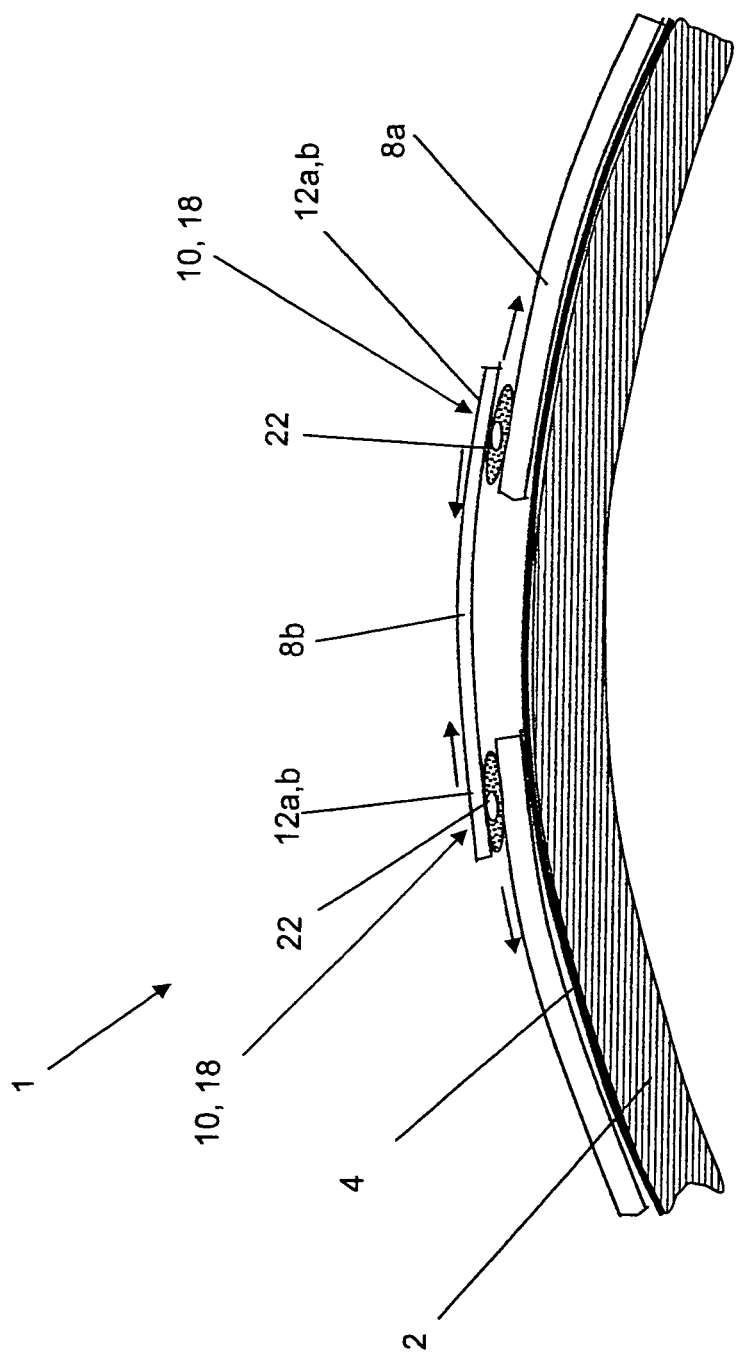
FIG. 4 is a fragmentary, cross-sectional view through a tubular liner according to a further embodiment of the invention, in which the protective tube includes a first partial portion, of a non-expandable material, and a second partial portion, of a likewise non-expandable material, which are connected to one another in overlapping regions by way of an adhesive connection that is displaceable in the circumferential direction.

In the case of the embodiment of the invention that is shown in FIG. 4, the partial sheets 8a, 8b of the tear-resistant material of the protective tube 10 are connected in the region of their longitudinal portions 12a and 12b in the respective overlapping region 18 by a bead of adhesive 22, that is a permanently tacky adhesive that extends in the longitudinal direction of the tubular liner 1 and forms or defines the expandable connecting portion 10. The bead of adhesive 22 has a circular or oval cross-sectional form or shape and, during the expansion of the tubular liner 1, rolls in the circumferential direction between the two mutually adjacent partial portions 8a, 8b of the protective tube 8 in the overlapping region 18 thereof, in order to allow a circumferential expansion of the protective tube 8 of non-expandable material when compressed air is introduced.

Figure 5:
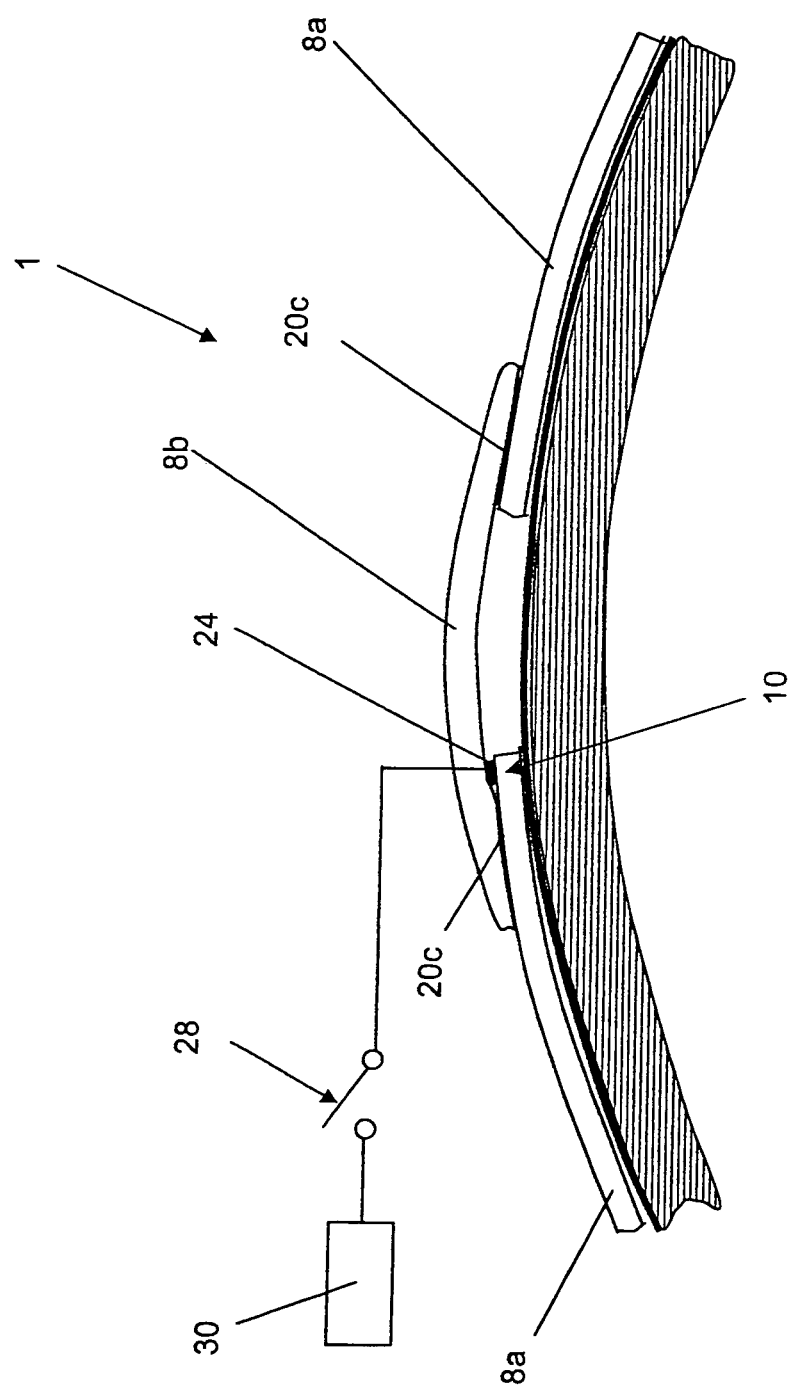
FIG. 5 is a fragmentary, cross-sectional view of a further embodiment of a tubular liner according to the invention, in which the protective tube includes a first partial portion, of a non-expandable material, and a second circumferential portion, of an expandable or else non-expandable material, incorporated between which is an electrically heatable heating wire, through the use of which the adhesive connection or heat-fused connection in the overlapping region can be opened by applying an electric current.

Finally, according to the embodiment of FIG. 5, a heating wire 24 may be disposed between the first partial portion 8a of non-expandable material, and the second partial portion 8b of an expandable or non-expandable material. The heating wire 24 may be disposed in a bead of adhesive that is not specifically shown and is a meltable adhesive, for example hotmelt adhesive, or the heating wire 24 may run directly in the overlapping region 18, in which the longitudinal portions 12a, 12 are connected to one another by a heat-fused seam. The heating wire 24 may similarly be applied directly on the underside of the second partial portion 8b, for example it may be adhesively attached by using an adhesive strip during the production of the respective partial sheet, which itself is formed of a heat-fusible plastic material in this case. As is indicated, the heating wire is able to be connected to a power source 30 by way of a switch 28, in order to heat the heating wire after pulling the tubular liner 1 into a sewer, when the tubular liner 1 is being made to expand, in order to open the expandable connecting location 10, defined in this case by the heating wire, by melting the material.

The invention claimed is:

1. A tubular liner for rehabilitating sewers, the tubular liner comprising:
    a circumferentially expandable reinforcing layer impregnated with a light-curable reactive resin;
    an outer tubular film surrounding said reinforcing layer and formed of a radially expandable material impermeable to UV light;
    a protective tube of a tear-resistant material disposed around said outer tubular film and having a connecting portion extending in longitudinal direction of said outer tubular film and configured to expand in circumferential direction by an introduction of compressed air into the tubular liner, said protective tube having longitudinal portions;
    said tear-resistant material of said protective tube passing over itself in an overlapping region in vicinity of said longitudinal portions;
    said expandable connecting portion including a predetermined tearing location extending in longitudinal direction of the tubular liner;
    said longitudinal portions of said protective tube being connected to one another in a substantially liquid-tight manner along said predetermined tearing location before expansion of the tubular liner; and
    said reinforcing layer and said outer tubular film configured to come to lie against an inner wall of a sewer before curing said reactive resin, upon introducing the tubular liner into a sewer to be rehabilitated and expanding the tubular liner by the introduction of compressed air.

2. The tubular liner according to claim 1, wherein said material of said outer tubular film is a liquid-tight and gas-tight plastic film.

3. The tubular liner according to claim 1, wherein said protective tube is fixed to an outer side of said outer tubular film along a contact portion extending at least partly in longitudinal direction of the tubular liner.

4. The tubular liner according to claim 3, wherein said contact portion includes at least one of a double-sided adhesive tape or an adhesive seam or a heat-fused seam running in vicinity of an underside of the tubular liner when the tubular liner is pulled into a sewer.

5. The tubular liner according to claim 1, wherein said predetermined tearing location includes:
    a single-sided adhesive tape adhesively attached to an outer side of said protective tube in vicinity of said longitudinal portions, or
    a double-sided adhesive tape disposed along said overlapping region between mutually adjacent longitudinal portions of said tear-resistant material and fixing them to one another.

6. The tubular liner according to claim 1, wherein said predetermined tearing location includes a heat-fusible seam or a bead of adhesive interconnecting mutually adjacent portions of said overlapping regions in a liquid-tight manner.

7. The tubular liner according to claim 6, wherein said heat-fused seam or said bead of adhesive runs within said overlapping region and has a wavy line or zigzag shape.

8. The tubular liner according to claim 1, wherein said predetermined tearing location includes a heating wire and a material configured to be liquefied under the effect of heat.

9. The tubular liner according to claim 8, wherein said material is a hotmelt adhesive.

10. The tubular liner according to claim 1, wherein said predetermined tearing location includes a longitudinal perforation introduced into said protective tube.

11. The tubular liner according to claim 10, wherein said protective tube includes a non-expandable material, and said longitudinal perforation is introduced into said non-expandable material only from one side and only partially penetrates said non-expandable material.

12. The tubular liner according to claim 1, which further comprises an elastic sealing compound covering said predetermined tearing location in a liquid-tight manner.

13. A tubular liner for rehabilitating sewers, the tubular liner comprising:
    a circumferentially expandable reinforcing layer impregnated with a light-curable reactive resin;
    an outer tubular film surrounding said reinforcing layer and formed of a radially expandable material impermeable to UV light;
    a protective tube of a tear-resistant material disposed around said outer tubular film and having a connecting portion extending in longitudinal direction of said outer tubular film and configured to expand in circumferential direction by an introduction of compressed air into the tubular liner;

said tear-resistant material of said protective tube having longitudinal portions and being configured to pass over itself in an overlapping region in vicinity of said longitudinal portions;

said expandable connecting portion including a bead of adhesive extending in longitudinal direction of the tubular liner, said bead of adhesive being permanently tacky, having a circular or oval cross-sectional shape and being configured to roll in circumferential direction between mutually adjacent portions of said overlapping region during the expansion of the tubular liner; and said reinforcing layer and said outer tubular film configured to come to lie against an inner wall of a sewer before curing said reactive resin, upon introducing the tubular liner into a sewer to be rehabilitated and expanding the tubular liner by the introduction of compressed air.

14. A tubular liner for rehabilitating sewers, the tubular liner comprising:

a circumferentially expandable reinforcing layer impregnated with a light-curable reactive resin;

an outer tubular film surrounding said reinforcing layer and formed of a radially expandable material impermeable to UV light;

a protective tube of a tear-resistant material disposed around said outer tubular film and having a connecting portion extending in longitudinal direction of said outer tubular film and configured to expand in circumferential direction by an introduction of compressed air into the tubular liner;

said protective tube including a first circumferential partial portion of non-expandable material only extending around a portion of said outer tubular film and having first and second longitudinal edges;

said protective tube including a second circumferential partial portion of an expandable or non-expandable material extending from said first longitudinal edge to said second longitudinal edge of said first partial portion and being connected to said longitudinal edges by a liquid-tight adhesive connection or a heat-fused connection; and said reinforcing layer and said outer tubular film configured to come to lie against an inner wall of a sewer before curing said reactive resin, upon introducing the tubular liner into a sewer to be rehabilitated and expanding the tubular liner by the introduction of compressed air.

15. The tubular liner according to claim 14, wherein said adhesive connection is a single-sided adhesive tape adhesively attached to an outer side of said protective tube from outside in vicinity of said longitudinal edges.

16. The tubular liner according to claim 14, wherein said expandable connecting portion includes a heat-fusible plastic material and a heating wire configured to sever said plastic material.

17. The tubular liner according to claim 14, wherein said second circumferential partial portion runs in vicinity of an upper side of the tubular liner when the tubular liner is pulled into a sewer.

18. The tubular liner according to claim 14, wherein said non-expandable material of said protective tube is a heavy truck tarpaulin material.

19. The tubular liner according to claim 18, wherein said tarpaulin material has a friction-reducing coating.

20. The tubular liner according to claim 1, A tubular liner for rehabilitating sewers, the tubular liner comprising:

a circumferentially expandable reinforcing layer impregnated with a light-curable reactive resin;

an outer tubular film surrounding said reinforcing layer and formed of a radially expandable material impermeable to UV light;

a protective tube of a tear-resistant material disposed around said outer tubular film and having a connecting portion extending in longitudinal direction of said outer tubular film and configured to expand in circumferential direction by an introduction of compressed air into the tubular liner; and at least one of a sliding device incorporated between said outer tubular film and an inner side of said protective tube or a friction-reducing coating provided between said inner side of said protective tube and an outer side of said outer tubular film;

said reinforcing layer and said outer tubular film configured to come to lie against an inner wall of a sewer before curing said reactive resin, upon introducing the tubular liner into a sewer to be rehabilitated and expanding the tubular liner by the introduction of compressed air.

21. The tubular liner according to claim 1, wherein said protective tube includes two or more partial sheets of non-expandable material connected to one another at longitudinal edges thereof.

* * * * *